(12) United States Patent
Scorticati et al.

(10) Patent No.: US 11,499,871 B2
(45) Date of Patent: Nov. 15, 2022

(54) DETECTOR OF ELECTROMAGNETIC RADIATION

(71) Applicant: LASER POINT s.r.l., Vimodrone (IT)

(72) Inventors: Davide Scorticati, Milan (IT); Sergio Pellegrino, Merate (IT); Giacomo Crapella, Milan (IT)

(73) Assignee: LASER POINT S.R.L., Vimodrone (IT)

( * ) Notice: Subject to any disclaimer, the term of this patent is extended or adjusted under 35 U.S.C. 154(b) by 412 days.

(21) Appl. No.: 16/621,780

(22) PCT Filed: Jun. 20, 2018

(86) PCT No.: PCT/EP2018/066480
§ 371 (c)(1),
(2) Date: Dec. 12, 2019

(87) PCT Pub. No.: WO2018/234411
PCT Pub. Date: Dec. 27, 2018

(65) Prior Publication Data
US 2021/0278281 A1 Sep. 9, 2021

(30) Foreign Application Priority Data

Jun. 23, 2017 (IT) .................. 102017000070606

(51) Int. Cl.
| | |
|---|---|
| *G01J 5/12* | (2006.01) |
| *G01J 1/42* | (2006.01) |
| *G01J 5/08* | (2022.01) |
| *G01K 17/00* | (2006.01) |

(52) U.S. Cl.
CPC .............. *G01J 5/12* (2013.01); *G01J 1/4257* (2013.01); *G01J 5/0853* (2013.01); *G01K 17/003* (2013.01); *G01J 2005/123* (2013.01)

(58) Field of Classification Search
CPC .......... G01J 5/12; G01J 1/4257; G01J 5/0853; G01J 2005/123; G01K 17/003
See application file for complete search history.

(56) References Cited

U.S. PATENT DOCUMENTS

| | | | |
|---|---|---|---|
| 11,067,434 B2* | 7/2021 | Scorticati | ................ H01L 35/34 |
| 2001/0007707 A1 | 7/2001 | Kinder et al. | |
| 2003/0118076 A1* | 6/2003 | Schieferdecker | ......... G01J 5/04 374/121 |
| 2003/0234037 A1* | 12/2003 | Tanaka | .................... H01L 35/32 136/238 |

(Continued)

FOREIGN PATENT DOCUMENTS

JP          2001-1358         5/2001

OTHER PUBLICATIONS

International Search Report, dated Jan. 22, 2019 (5 pages).

(Continued)

*Primary Examiner* — Marcus H Taningco
(74) *Attorney, Agent, or Firm* — Jacobson Holman PLLC

(57) ABSTRACT

A detector of electromagnetic radiation (RL) is described. The detector comprises:
  an oriented polycrystalline layer (2) of thermoelectric material,
  a substrate (1) superimposed on the top surface of the oriented polycrystalline layer so that the back surface (10) is in contact with the oriented polycrystalline layer,
  first and second electrodes spaced the one from the other and in electrical contact with the oriented polycrystalline layer. The substrate comprises at least one ceramic layer and the oriented polycrystalline layer has a crystal orientation at an angle comprised between 30 degrees and 55 degrees relative to a normal to the top surface of the substrate.

18 Claims, 2 Drawing Sheets

(56) References Cited

U.S. PATENT DOCUMENTS

| | | | |
|---|---|---|---|
| 2004/0102051 A1 | 5/2004 | Bottner et al. | |
| 2010/0126548 A1* | 5/2010 | Jang | H01L 35/32 977/762 |
| 2011/0024604 A1 | 2/2011 | Takahashi et al. | |
| 2011/0291010 A1 | 12/2011 | Takahashi et al. | |
| 2014/0091304 A1* | 4/2014 | Semerad | H01L 31/0368 257/49 |
| 2014/0091307 A1* | 4/2014 | Semerad | H01L 31/0368 257/64 |
| 2016/0351778 A1* | 12/2016 | Yonemura | G01J 5/12 |
| 2017/0179363 A1 | 6/2017 | Hayashi et al. | |

OTHER PUBLICATIONS

C.H. Suen et al., "Enhanced thermoelectric properties of SnSe thin films grown by pulsed laser glancing-angle deposition", Journal of Materiomics, vol. 3, No. 4, Jun. 9, 2017, pp. 293-295, cited in the ISR (6 pages).

Y. Zhao et al., "Designing nanostructures by glancing angle deposition", Proceedings of SPIE, vol. 5219, Oct. 27, 2003, p. 59, cited in the ISR (16 pages).

R. Zeipl et al., "Properties of Thermoelectric Nanocomposite Bi2Te3 Layers Prepared by PLD", Sensors & Transducers, vol. 183, No. 12, Dec. 1, 2014, pp. 103-109, cited in the ISR (7 pages).

Z. G-Y et al., "A high-performance laser energy meter based on anisotropic Seebeck effect in a strongly correlated electronic thin film", Applied Physics a Materials Science & Processing, Springer Berlin Heidelberg, Berlin/Heidelberg, vol. 113, No. 2, Mar. 13, 2013, pp. 347-353, cited in the ISR (7 pages).

\* cited by examiner

DETECTOR OF ELECTROMAGNETIC RADIATION

BACKGROUND OF THE INVENTION

The present invention relates to a detector of electromagnetic radiation, particularly laser radiation.

Laser-radiation detectors able to detect high energy pulses (i.e. $10^{-3}$-10 J) are mainly represented by calorimeters, thermopiles and pyroelectric sensors. Thermopiles can be further subdivided into two different categories: radial and axial devices.

Calorimeters measure the incident power on the target surface by measuring the temperature differential between the inlet and the outlet of a liquid coolant. These detectors suffer from the slowest response time of all the above-mentioned types of detectors, i.e. tens of seconds.

Radial thermopiles are represented by thermal disks, wherein the radiation target disk includes an array of thermocouples arranged in two concentric circles, in turn concentric with the disc. When a thermal gradient is established radially in the disc by laser radiation incident thereon, the thermocouple array generates an electro-motive force (e.m.f) or voltage representative of the power of the incident laser radiation. The natural response time of this type of thermopiles is between about 1 s and 60 s, depending on their design. Two significant drawbacks of this types of power meter are the size and the response time. Size often causes a power meter head to be difficult to fit into a laser apparatus for power measurement.

There is therefore a need for an inexpensive laser power meter head having a heat-sink which is significantly smaller than above-discussed prior art heat-sinks but which is still capable of measuring relatively high continuous wave (CW) laser power with a shorter response time.

Axial thermopiles are Peltier-like devices, designed adopting multiple electrically interconnected thermocouples, which can measure a heat flux axially across a suitable substrate. This type of sensors using the standard thermoelectric effect are an evolution of the common radial thermopile. This type of detectors can be smaller, compared to radial thermopiles. However, the thermal design of this kind of sensors only allows for natural response times currently in the order of 0.1 to 1 s. Besides, the design of multiple axial thermocouples often implies a scarce coverage of the active area of the sensor.

Sensors based on the pyroelectric effect transduce a thermal gradient into an electric signal. That is, the polarization change due to a thermal gradient gives rise to a voltage across the crystal. On the one hand, they combine the high sensitivity (which can be as high as 1000 V/W) with the possibility to be tailored in their design for high energy pulses, and higher repetition rates (currently up to 200 kHz), compared to thermopiles and calorimeters. However, pyroelectric sensors are currently limited by inability thereof to measure continuous wave (cw) laser radiation, due to the natural leakage current across the active material. In fact, the working principle of pyroelectric materials, based on the response to transient changes of temperature, allows just measurements of pulsed to quasi-cw, but not purely cw, or long pulse laser sources.

A relatively newer and different category of power meters is defined by sensors using the transverse thermoelectric effect, which have several advantages compared to the previously discussed types.

Sensors using the laser induced transverse voltage (LITV) effect also transduce a thermal gradient into an electric signal. Thin films of suitable materials (e.g. Bi, $Bi_2Te_3$, al:ZnO, Sb), deposited with a slant angle between the evaporation source and the substrate are known to show a transverse thermoelectric response to laser-irradiation. That is, if a thermal gradient is present along the normal direction to the film surface, a thermoelectric response is generated, longitudinally to the plane of the film surface. The intensity of the generated electric signal, extractable along the longitudinal plane, has a well-defined direction and it is parallel to the projection of the angled grains of the thin film active material grown onto the substrate, showing a minimum in the coplanar perpendicular direction.

The adoption of the LITV effect has the intrinsic advantage of showing a good conversion efficiency of a thermal signal into an electric voltage, while showing response times in the nanosecond range. Besides, the fabrication of the device results more controllable as it requires less technological steps, hence resulting cheaper and simplified. Another advantage of the LITV based devices over standard thermoelectric devices is the uniform coverage of the active area, with respect to a design based on axially disposed thermocouples.

Moreover, the active area of LITV based sensors does not have limitations in size of the active area, whereas the uniformity of the deposition of the active film is maintained. At the same time, a good design greatly reduces the area around the active sensing region, achieving lateral dimensions smaller than radial thermopiles, comparing detectors with the same active area.

Although sensors based on the LITV effect are very promising in the technological area of laser radiation energy/power sensing, a limitation is posed by the disadvantageous requirement of complex alloys—often composed by toxic materials—for the production of the active layer, as the sensors of US 2011/0024604 A1, US 2011/0291012 A1, US 2014/0091307 A1 or US 2014/0091304 A1.

Moreover, fabrication methods disclosed by previous patents (US 2011/0024604 A1, US 2011/0291012 A1, US 2014/0091304 A1 and US 2014/0091307 A1) describe epitaxial-like growth of the active tilted nearly lattice-matched thermoelectric layer onto the crystal substrate. This approach poses strong limitations regarding the materials usable for the active film and the substrate, i.e. it requests nearly lattice matched materials pairs, as clearly evidenced by TEM images in US 2011/0024604 A1, and widely known from technical literature. Furthermore, US 2004/0102051 A1 describes different embodiments of manufacturing methods based on the use of seed buffer layer and artificial tilted structures to force the deposition on the preferred crystal plane of the thermoelectric material, restricted to V-VI compounds.

In fact, within the above-mentioned patent applications, there is the requirement of either a determined atomic configuration of the substrate (i.e. a specific material with a specific crystallographic plane), or the presence of an additional seed buffer layer again with a determined atomic configuration between the active layer and the substrate. Such determined atomic structure of the seed buffer layer is needed to influence an epitaxial-like growth of a highly crystalline film with a specific angle respect to the surface of the substrate during the deposition of the active film, adding complexity to the manufacturing as well as a supplementary and critical processing step.

In particular, US 2011/0024604 A1 describes a method of growing $Ca_xCoO_2$ tilted films onto two specific planes of the $Al_2O_3$ substrate, specifically the n-plane and the s-plane, which generate inclination angles of the $Ca_xCoO_2$ planes of 62° and 70° respectively, with respect to the surface of the substrate.

US 2011/0291012 A1 discloses different embodiments, whereas the growth of the active tilted thermoelectric layer is still dependent on the atomic structure of the substrate. In fact US 2011/0291012 A1 discloses that "the inclination angle $\alpha$ of the crystal planes 35 of the inclined thin film 32 is determined according to the inclination angle $\beta$ of the low-index planes 34 of the inclined substrate 31, and $\alpha$ satisfies $\alpha=\beta+\theta$, where $\theta$ is 0 to 10 degrees".

US 2014/0091304 A1 discloses a fabrication method of tilted thermoelectric films from the groups of dysprosium barium cuprate ($DyBa_2Cu_3O_7$-d), strontium sodium cobaltate ($Sr_{0.3}Na_{0.2}CoO_2$), and strontium cobaltate ($Sr_3Co_4O_9$), which require an intermediate seed buffer layer of materials such as magnesium oxide (MgO), yttrium stabilized zirconia (YSZ) and cerium oxide ($CeO_2$). The seed buffer layer must have a columnar grain structure with crystal axis (c-axis) tilted at an angle $\alpha$ in the direction of the by between about 10-degrees and about 45 degrees, relative to a normal to the substrate surface.

In US 2004/0102051 A1, again a seed buffer layer is adopted in order to orientate the grains of the active thermoelectric material with respect to the surface of the substrate. Furthermore, US 2004/0102051 A1 discloses the use of similar active materials for fabricating their device, not only requires a seed buffer layer but also an additional post deposition annealing treatment to orientate the c-axis of the thermoelectric layer at a suitable angle. The latter adds an additional complexity to the manufacturing, reducing the robustness of the overall industrial process, compared to the fabrication method adopted by the present invention.

Besides, US 2004/0102051 A1 discloses in one embodiment the use of etched roof-tile-shaped structures on the substrate silicon surface, which must be then covered with an oxide. The substrate is then rotated with the same angle of the structures with respect to the evaporation source, in order to obtain a more rapid growth of vertical grains with respect to the etched structures. Those grains have then an angle with respect to the original surface of the substrate. Again, the described procedure adds additional complexity to the manufacturing, reducing the robustness of the overall industrial process, compared to the fabrication method adopted by the present invention.

SUMMARY OF THE INVENTION

In view of the state of the art, it is an object of the present to provide a detector of laser radiation which is different from prior art and that overcomes the disadvantages of the referenced prior art, i.e. that does not make use of any seed buffer layer, does not need highly crystalline oriented substrates and does not requests the formation of artificial structures on the substrate surface.

According to the present invention, said object is achieved by means of a detector of electromagnetic radiation, comprising:
   an oriented polycrystalline layer of thermoelectric material,
   a substrate superimposed on the top surface of the oriented polycrystalline layer so that the back surface is in contact with the oriented polycrystalline layer,
   first and second electrodes spaced the one from the other and in electrical contact with the oriented polycrystalline layer, characterized in that said substrate comprises at least one ceramic layer and said oriented polycrystalline layer has a crystal orientation at an angle comprised between 30 degrees and 55 degrees relative to a normal to the top surface of the substrate.

The present invention describes a detector of laser radiation which is easy to produce, reliable, and is based on the LITV effect for the measurement of high energy pulses of direct laser radiation. The manufacture of the active layer consists of a single manufacturing step and its response uniformity over the entire active area of the sensor is not varied within a broad range of roughness of the substrate, hence determining a robust process stability.

The detector according to the present invention increases the response time from the typical nanosecond regime of LITV based sensors to tens of milliseconds, allowing the output voltage signal of the sensor to be digitalized without the need of an extremely fast and expensive electronics.

Moreover, the detector according to the present invention shows a high damage threshold to pulsed laser irradiation, hence allowing the measurement of highly energetic laser pulses, that is laser pulses with a power higher than $10^{-3}$ joule with relatively low repetition rates (e.g. 10-100 Hz).

The layout of the detector according to the present invention depends on the laser source to be measured. By changing the thickness of the substrate both the response time and the damage threshold of the sensor to laser irradiation can be adapted, being the response time inversely proportional to the thickness of the substrate, while the damage threshold of the sensing active layer directly proportional to it. In this way, the sensor described by the present invention is capable of measuring not only from cw to pulsed laser radiation up to hundreds of Hz, but also of operating in a broad range of incident optical power densities ($10^6$ to $10^{12}$ W/cm), depending on the choice of material for the substrate. Moreover, the thermal nature of the sensor enables the capability to work in a broadband spectrum, from UV to THz.

The detector according to the present invention comprises a substrate of a ceramic material, wherein for ceramic material it is intended a highly thermally conductive (that is with a thermal conductivity comprised between 20 and 200 W/mK) and dielectric material, with a high melting point (higher than 1800° C.) e.g. sintered aluminum nitride (AlN), sintered silicon nitride ($Si_3N_4$), sintered silicon carbide (SiC), sintered boron nitride (BN), sintered boron carbide ($B_4C$) or sintered alumina ($Al_2O_3$). The substrate is not required to have a specific grain orientation. Alternatively, a metallic substrate may be used, previously passivated by a dielectric thin polycrystalline layer of ceramics provided with a good thermal conduction coefficient (e.g. AlN, $Si_3N_4$, SiC, BN, $B_4C$, $Al_2O_3$).

The substrate acts as target of incident laser radiation on the front side and must be completely opaque to the incident electromagnetic radiation. When the chosen substrate results optically transparent (i.e. AlN, $Al_2O_3$), an additional absorption opaque layer of different materials (e.g. SiC, $Si_3N_4$, carbon nanotube composite coatings or black textured metallic layers) and thickness (0-10 μm) must be added on the front side. That is, the e.m. radiation is totally absorbed by the substrate—or within the absorption layer—and converted into heat. Therefore, only the heat flux and not the e.m. radiation does reach the active material directly, differently from the detector described in US 2011/0291012 A1, where the substrate is specifically transparent to e.m. radiation.

The right choice of the substrate consists in using selected materials with higher damage threshold to electromagnetic radiation, with respect to the used active material, and an overall low thermal resistance, i.e. the substrate must be thin in order to not excessively reduce the speed of the sensor.

For reducing the reflectivity, laser texturing can be adopted for enhancing the optical light trapping on the front side of the substrate.

On the backside of the substrate, a thin polycrystalline active layer of a selected thermoelectric material (e.g. Bi, $Bi_2Te_3$, Al:ZnO, Sb) is placed with crystal orientation at an angle between 30° and 55°, with an optimum at 45°. The substrate is not oriented as the thin polycrystalline active layer.

One main difference between the present patent and the previous inventions consists in that the active element is not highly-crystalline but is highly multi-crystalline, instead. The adoption of the GLAD technique to fabricate the active film of the sensor permits the use of substrates without a specific atomic configuration, such as sintered ceramic layers without the need of depositing seed layers with specific atomic configurations nor an expensive lapping procedure to control its surface roughness, adding robustness to the industrial fabrication method.

Formed below the active material, a thin adhesion layer (<20 nm) consisting of Ti is placed between the active material and the passivation layer, composed of a thin film of platinum or palladium (80-100 nm).

The active material, as well as the subsequent layers must be shaped in the form of adjacent closely packed, electrically isolated strips. The strips must be parallel to the direction of the projection of the tilted grains onto the substrate.

A metallic conductive layer in electrical contact with the active layer is configured for interconnecting either in series or in parallel the extremities of the strips of the active layer by forming a sensor chip. Another possibility consists in adopting wire bonding to contact the extremities of the strips of active material to an external, thermally isolated, multi-layered PCB.

The sensor chip is then attached on its back surface to a suitable heatsink.

BRIEF DESCRIPTION OF THE DRAWINGS

For a better understanding of the present invention, some embodiments thereof are now described, purely by way of non-limiting examples and with reference to the annexed drawings, wherein:

FIG. 1 consists of FIGS. 1A, 1B and 1C.

DETAILED DESCRIPTION OF THE INVENTION

Figure 1A:
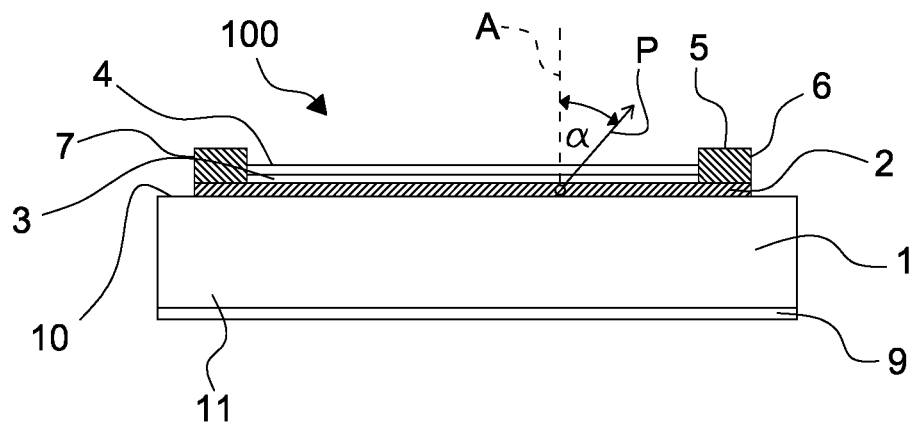
FIG. 1A is a cross-section view of a detector for laser radiation in accordance with an embodiment of the present invention in a first step of manufacturing method of the detector.
Figure 1B:
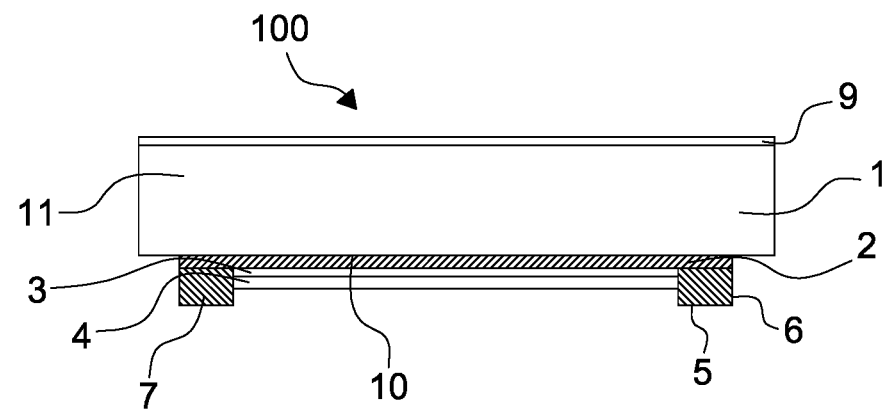
FIG. 1B is a cross-section view of a detector for laser radiation in accordance with an embodiment of the present invention in a second step of manufacturing method of the detector.
Figure 1C:
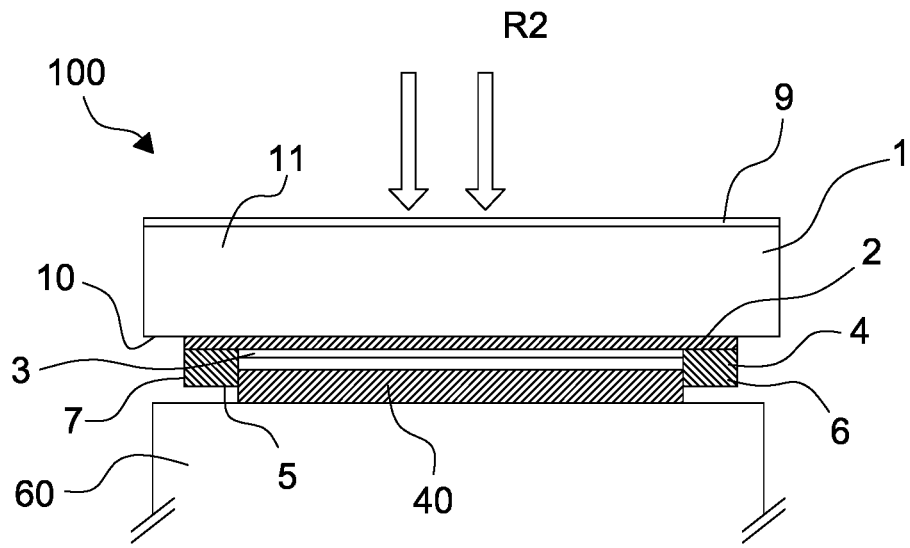
FIG. 1C is a cross-section view of a detector for laser radiation in accordance with an embodiment of the present invention.
Figure 2:
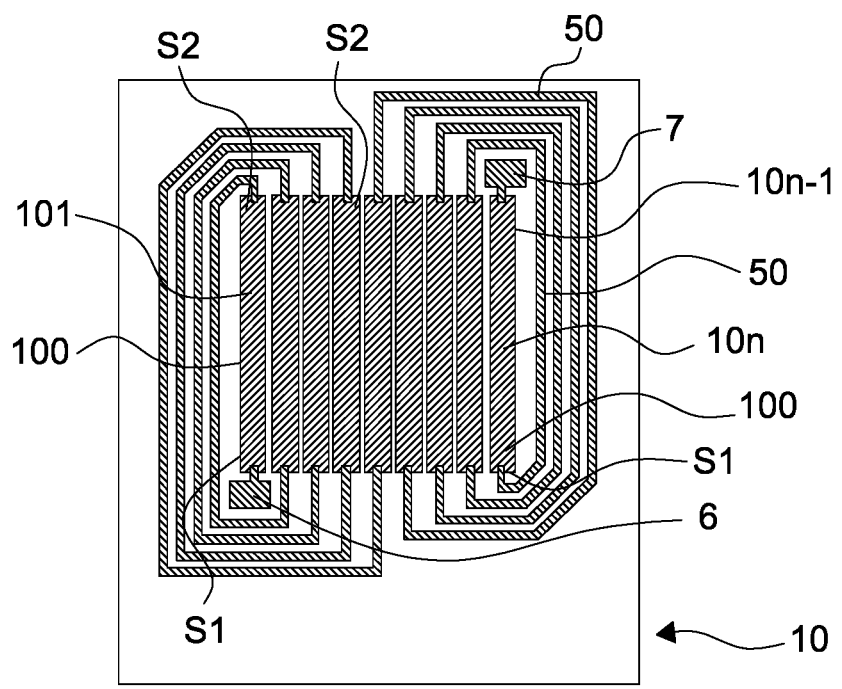
FIG. 2 is a bottom view of a serial arrangement of electrodes and patterned sensor layer for the detector of FIG. 1C.
Figure 3:
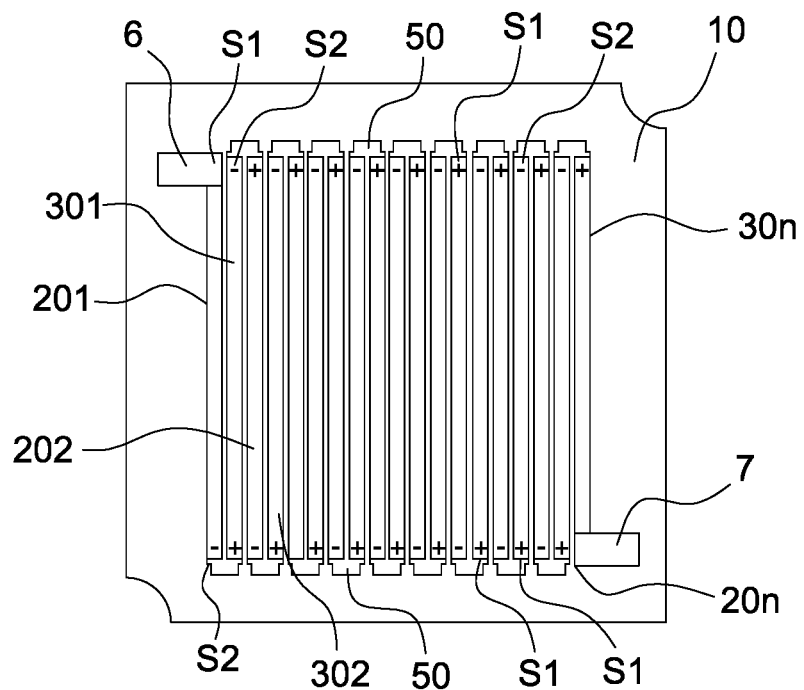
FIG. 3 is a bottom view of another serial arrangement of electrodes and patterned sensor layer for the detector of FIG. 1C.

Referring to FIGS. 1-3 a detector of laser radiation according to a preferred embodiment of the present invention is described.

The detector of laser radiation in accordance with the present invention comprises a substrate 1 comprising a ceramic layer, preferably a ceramic layer without the requirement of a specific grain orientation, that is a highly thermally conductive (higher than 100 W/mK) and dielectric material with a high melting temperature (higher than 1800° C.). The substrate 1 may be constituted of the only ceramic layer, preferably a sintered ceramic layer, e.g. sintered aluminum nitride (AlN), sintered silicon nitride ($Si_3N_4$), sintered silicon carbide (SiC) sintered boron nitride (BN), sintered boron carbide ($B_4C$) or sintered alumina ($Al_2O_3$), or the substrate may comprise a metallic substrate (comprising for example Al or Cu) which has been previously electrically passivated by a thin non oriented ceramic layer with a good thermal conduction coefficient (e.g. AlN, $Si_3N_4$, SiC, BN, $B_4C$, $Al_2O_3$). Preferably the thickness of the substrate is comprised in the range between 50-1000 μm; by changing the thickness of the substrate both the response time and the damage threshold of the sensor to laser irradiation can be adapted for a specific application, being the response time inversely proportional to the thickness of the substrate, while the damage threshold of the sensing active layer directly proportional to it.

Preferably, the top surface 10 of the substrate 1 presents a roughness $R_a$ lower than 2 μm.

On the top surface 10 of the substrate 1 in FIG. 1A, a polycrystalline layer 2 is deposited with crystal orientation at an angle α, preferably comprised between 30 and 55 degrees, relative to the normal A to the top surface 10 of the substrate 1. That is, the polycrystalline layer 2 has a columnar grain structure with a crystal axis P tilted at the angle α with respect to the normal axis A. Preferably, the polycrystalline layer 2 is deposited with crystal orientation at 45 degrees for obtaining an optimum deposition.

The polycrystalline layer 2 represents the active layer of the detector of laser radiation and the inclined oriented crystal structure of the polycrystalline layer 2 needs to provide the desired thermoelectric effect. The substrate is not oriented as the thin polycrystalline active layer.

The polycrystalline layer 2 is deposited on the top surface 10 of the substrate 1 and is not grown by means of an epitaxial growth. For this reason, the material of the substrate 1 does not require a specific grain orientation, as in the prior art, and the substrate 1 may be constituted of the only ceramic layer, preferably a sintered ceramic layer.

The polycrystalline layer 2 can be deposited adopting either physical vapor deposition technique (PVD) or electron beam physical vapor deposition (EBPVD) and by placing the substrate 1 at the slant angle α with respect to the evaporation source, by means of the well-known glancing angle deposition technique (GLAD). The latter forms a tilted highly multi-crystalline grain structure of the deposited active layer. The GLAD technique is well described in Chapter 13—Glancing Angle Deposition, In Handbook of Deposition Technologies for Films and Coatings (Third Edition), edited by Peter M. Martin, William Andrew Publishing, Boston, 2010, Pages 621-678, ISBN 9780815520313, https://doi.org/10.1016/B978-0-8155-2031-3.00013-2. In order to obtain the polycrystalline layer 2 with crystal orientation at the angle α, the partial pressure inside the deposition chamber during evaporation must be in the range of $10^{-3}$-$10^{-7}$ mbar, the deposition rate in the range of 0.1-1000 nm/s and the substrate temperature between 293-500 K.

Preferably, the polycrystalline layer 2 is deposited with crystal orientation at 45 degrees for obtaining an optimum deposition. The polycrystalline layer 2 is a thin layer;

preferably the thickness of the polycrystalline layer 2 is comprised between 0.3 μm and 10 μm, being this a suitable range to obtain a high enough sensitivity combined with a quick restoring time of thermal gradient across the polycrystalline layer 2.

The material of the polycrystalline layer 2 is a material selected from a group of thermoelectric material comprising bismuth (Bi), bismuth telluride ($Bi_2Te_3$), aluminum doped zinc oxide (Al:ZnO) and antimony (Sb). Preferably the material containing bismuth is deposited over the top surface 10 of the substrate 1 by a thermal evaporation technique.

The roughness $R_a$ of the top surface of the substrate 1 helps the adhesion of the active material layer 2 to the substrate 1 preventing delamination and increases the diffused reflection of the detector.

Even a relatively high roughness (>0.6 μm) can be adopted without affecting the transverse thermoelectric properties of films with thickness lower than 500 nm. In fact, as long as the average orientation of the tilted grains remains unaltered, the response of the sensor remains globally stable, using a spot with a diameter $>>R_a$.

An adhesion layer 3 is formed on the top surface of the polycrystalline layer 2; the adhesion layer 3 has preferably a thickness lower than 20 nm and preferably consists of titanium.

A passivation layer 4, preferably a highly non-reactive and high melting temperature layer, is deposited on the top surface of the adhesion layer 3; the passivation layer 4 has preferably a thickness ranging from 80 nm to 100 nm and preferably consists of platinum or palladium.

The adhesion layer 3 is configured to act as adhesion layer between the active layer 2 and the passivation layer 4.

A metallic conductive contact layer 5 is deposited on the layer 2 or on the layer 4 in the case wherein the layers 3 and 4 are conductive. The metallic conductive layer 5 is in electrical contact with the polycrystalline layer 2.

The metallic conductive layer 5 is deposited so as to form two contacts spaced the one from the other; the contacts of a single strip represent the electrodes 6, 7. The transverse electric field between the electrodes results in a voltage V(t).

The material of the metallic conductive layer 5 may be gold (Au), copper (Cu), silver (Ag) or molybdenum (Mo). Alternately, the metallic conductive layer 5 is made of the same material of the active layer, in order to avoid thermocouple effects at the junctions between the active and the conductive layer 5, which sum up in the case of the serial interconnection of the strips, moving the baseline of the output voltage signal of the sensor. That is, the metallic conductive contact layer 5 may be bismuth (Bi), bismuth telluride ($Bi_2Te_3$), aluminum doped zinc oxide (Al:ZnO) or antimony (Sb).

The detector in FIG. 1A is then flipped so that the back surface 11 of the substrate 1 becomes the top surface of the substrate 1, as shown in FIG. 1B.

The sensor chip is then attached on its back side, that is the surface 10 of the substrate 1, to a suitable heatsink 60 using a thermally conductive and dielectric adhesive layer 40, as shown in FIG. 1C.

The substrate 1 acts as absorber of incident laser radiation on the front side. When required, an additional absorption layer 9 of different materials (e.g. SiC, $Si_3N_4$, carbon nanotubes or black textured metallic layers) and thickness (0.1-10 μm) may be deposited on the surface 11, when the chosen substrate results optically transparent to laser radiation (e.g. AlN, $Al_2O_3$). For further reducing the reflectivity of the substrate to the incident electromagnetic radiation, laser texturing to form surface morphologies able to enhance the optical light trapping on the surface 11 of the substrate. Therefore, the substrate 1 is made of a material that is opaque to the electromagnetic radiation or is covered with the additional absorption layer 9 placed on the surface 11.

Thin films of suitable materials (e.g. Bi, $Bi_2Te_3$, Al:ZnO, Sb), deposited with a slant angle between the evaporation source and the substrate show a transverse thermoelectric response to laser-irradiation. That is, if a thermal gradient is present along the normal direction to the film surface, a thermoelectric response longitudinally to the plane of the film surface is generated.

The intensity of the generated electric signal, extractable along the longitudinal plane, has a well-defined direction and it is parallel to the projection of the angled grains of the film of active material grown onto the substrate, showing a minimum in the coplanar perpendicular direction.

The sensor acts as an electromotive force (e.m.f.) generator when irradiated by a radiation laser RL. Its signal is proportional to the temperature gradient formed between the external surface of the active film and its interface with the substrate.

The response of the sensor can be expressed by the formula:

$$V(t) \propto \sin(2\alpha) \cdot (S_\parallel - S_\perp) \cdot \Delta T(t),$$

where $\alpha$, $S_\parallel$, $S_\perp$ and $\Delta T$ are, respectively, the tilt-angle of the grains of the active layer 2 with respect to the normal direction to the substrate plane, the Seebeck coefficient in the direction parallel to the projection of the angled grains of the active layer 2 onto the substrate surface 10 in FIG. 1A, the Seebeck coefficient perpendicular to the substrate surface 10 and the temperature gradient across the film.

Preferably the detector according to the invention must be patterned into a single strip 100 or a plurality of strips 100, preferably in the form of adjacent closely packed and electrically isolated strips as illustrated in FIGS. 2-3.

Each strip 100 has preferably a width W1 of about 0.5 to 30 mm and a length L1 in the range of 5 to 30 mm. Each strip is parallel to the direction of the projection of the tilted grains onto the substrate 1. The space W2 between two adjacent strips of a plurality of strips must be as small as possible, preferably comprised between 10 μm and 100 μm, in order to achieve the maximum relative coverage of the substrate by the sensing material. The metal layer 5 provides to form the contacts at the extremities S1 and S2 of each strip; the contacts are spaced the one from the other. The isolation of the strips can be performed either by laser ablation of the detector in FIGS. 1A, 1B, 1C or by a suitable masking of the substrate 1 prior to the deposition of the layers 2-5. The formation of strips 100 serves for two different reasons. First, for better collecting the electric signal at the extremities of the strip. Second, for matching the impedance of the fast sensor according to the invention with the electronics which will digitalize the analogic signal originated from the sensor. Given a fixed rectangular area of the active material and a fixed thickness of the deposited films, the lateral density of the strips is dictated by the electric impedance of the fully interconnected device.

The design of the conductive circuit is chosen in order to optimize the impedance matching with the electronics used for reading the output signals, extracted from the electrodes 6 and 7.

As shown in FIG. 2, the conductive metallic layer 50 is arranged for interconnecting in series the extremities of the strips of the active layer 2. Considering FIG. 2, the first extremity S1 of each strip of the plurality of strips 101 . . . 10n—arranged in succession from the first strip 101 to the last strip 10*n*—is the bottom extremity. Analogously, the second extremity S2 of each strip of the plurality of strips is the top extremity in FIG. 2. The electrode 6 is placed in contact with the polycrystalline layer 2 of the first extremity S1 of the first strip 101 of the plurality of strips. Electrode 7 is placed in contact with the polycrystalline layer 2 of the second extremity S2 of the last strip 10*n* of the plurality of strips. The second extremity S2 of the first strip 101 is placed in electrical contact, by means the metallic conductive layer 50, with the first extremity S1 of the second strip 102 of the plurality of strips, and so on.

As shown in FIG. 3, the conductive metallic layer 50 is arranged for interconnecting in series the extremities of the strips of the active layer 2. However, in this case, differently from the detector in FIG. 2, a plurality of alternated strips 201, 301 . . . 20*n*, 30*n* with opposite grain orientations are present. That is, the oriented polycrystalline layers of the adjacent strips (201, 301; 202, 302 . . . 20*n*, 30*n*) have opposite grain orientations. The dual orientation of the grains is obtained by performing two subsequent depositions of the active material. With the first deposition step, all the alternated strips with one same grain orientation are made, by masking properly the substrate 1 and successively by adopting either physical vapor deposition technique (PVD) or electron beam physical vapor deposition (EBPVD) and placing the substrate 1 at the slant angle α with respect to the evaporation source, by means of the well-known glancing angle deposition technique (GLAD). The second deposition is performed after rotating the substrate 1 by 180 degrees around the axis, which passes from the center of the substrate and is perpendicular to the surface plane. Masking the substrate 1 properly and successively by adopting either physical vapor deposition technique (PVD) or electron beam physical vapor deposition (EBPVD) and placing the substrate 1 at the slant angle α with respect to the evaporation source, by means of the well-known glancing angle deposition technique (GLAD, all the strips with opposite grain orientation, with respect to those obtained during the first deposition, are made.

Said plurality of alternated strips 201, 301 . . . 20*n*, 30*n* form a succession of alternated strips 201, 301, 202, 302 . . . 20*n*, 30*n*. In this way, the electrode 6 is placed in contact with the polycrystalline layer 4 of the first extremity S1 of the first strip 201 of the plurality of strips 201, 301 . . . 20*n*, 30*n*. Electrode 7 is placed in contact with the polycrystalline layer 2 of the second extremity S2 of the last strip 30*n* of the plurality of strips 201, 301 . . . 20*n*, 30*n*. The second extremity S2 of the first strip 201 is placed in electrical contact, by means the metallic conductive layer 50, with the adjacent first extremity S1 of the first strip 301 of the plurality of strips 201, 301 . . . 20*n*, 30*n* in the bottom of FIG. 3. The second extremity S2 of the strip 301 is placed in electrical contact, by means the metallic conductive layer 50, with the adjacent first extremity of the strip 202 of the plurality of strips 201, 301 . . . 20*n*, 30*n* in the top of FIG. 3, and so on. The arrangement of the detector in FIG. 3 allows a more compact detector with respect to the detector in FIG. 2.

According to a variant of the embodiment of the present invention, the surface 10 of the substrate 1 is texturized (i.e. by laser scribing). In this way, it is obtained a reduction of the reflectivity and a consequent enhancing of the optical light trapping.

According to a further variant of the fast detector of the invention, an additional absorber layer 9 is deposited onto the top surface 11 of the substrate 1. Suitable materials for this layer are SiC, $Si_3N_4$, $Al_2O_3$, TiO, carbon nanotubes or black textured metallic layers. Preferably, the range of thickness of this layer ranges from 0.1 to 20 depending on the refractive index of the material and the spectral working region of the sensor. The increase of thickness increases the response time of the sensor, while increasing its damage threshold to laser radiation.

The invention claimed is:
1. A detector of electromagnetic radiation, comprising:
    an oriented polycrystalline layer of thermoelectric material, which is an active layer of the detector,
    a substrate superimposed on a top surface of the oriented polycrystalline layer so that a back surface of the substrate is in contact with the oriented polycrystalline layer, the substrate is a target of incident electromagnetic radiation on a front side,
    first and second electrodes spaced from one another and in electrical contact with the oriented polycrystalline layer,
    wherein the substrate comprises at least one ceramic layer and the oriented polycrystalline layer has a crystal orientation at an angle of between 30 degrees and 55 degrees relative to a normal to a top surface of the substrate, which is non-oriented.
2. The detector according to claim 1, wherein the substrate comprises a metallic layer which has been electrically passivated by a ceramic layer.
3. The detector according to claim 1, comprising at least one strip formed by the oriented polycrystalline layer which extends between the first and the second electrodes.
4. The detector according to claim 1, comprising a plurality of strips wherein each strip is formed by the oriented polycrystalline layer, the strips of the plurality of strips are spaced apart and are parallel to each other, the strips of the plurality of strips being arranged in succession from a first strip to a n-th strip, each strip of the plurality of strips having a first extremity and a second extremity, the first electrode being connected to the first extremity of a first strip of the plurality of strips and the second electrode being connected to the second extremity of the n-th strip of the plurality of strips, the second extremity of each strip of the plurality of strips being in electrical contact with the first extremity of a successive strip of the plurality of the strips.
5. The detector according to claim 1, comprising a plurality of strips wherein each strip is formed by the oriented polycrystalline layer but wherein the oriented polycrystalline layers of adjacent strips have opposite grain orientations, the strips of the plurality of strips are spaced apart and are parallel to each other, the strips of the plurality of strips being arranged in succession from a first strip to a n-th strip and wherein, each strip of the plurality of strips having a first extremity and a second extremity, the first electrode being connected to the first extremity of the first strip of the plurality of strips and the second electrode being connected to the second extremity of the n-th strip of the plurality of strips, the second extremity of each strip of the plurality of strips being in electrical contact with the first extremity of a successive strip of the plurality of the strips.
6. The detector according to claim 1, wherein a top surface of the substrate present a roughness lower than 2 μm.
7. The detector according to claim 1, comprising a passivation layer under and in contact with the oriented polycrystalline layer.
8. The detector according to claim 7, wherein an adhesion layer is placed between the oriented polycrystalline layer and the passivation layer.

9. The detector according to claim 7, wherein there is an absorber layer superimposed on a top surface of the substrate.

10. The detector according to claim 1, wherein a front surface of the substrate is texturized.

11. The detector according to claim 1, wherein the at least one ceramic layer of the substrate is formed of a material selected from a group of materials which comprises sintered aluminum nitride (AlN), silicon nitride ($Si_3N_4$), silicon carbide (SiC) boron nitride (BN), boron carbide ($B_4C$), or alumina ($Al_2O_3$).

12. The detector according to claim 1, wherein the oriented polycrystalline layer is formed of a material selected from a group of materials which comprises bismuth (Bi), bismuth telluride ($Bi_2Te_3$), aluminum doped zinc oxide (Al:ZnO) or antimony (Sb).

13. The detector according to claim 1, wherein the substrate is made of a material that is opaque to the electromagnetic radiation.

14. The detector according to claim 1, wherein the substrate is a sintered ceramic layer.

15. The detector according to claim 1, wherein the oriented polycrystalline layer is formed on the substrate by deposition.

16. The detector according to claim 15, wherein the oriented polycrystalline layer is deposited by means of a glancing angle deposition technique.

17. The detector according to claim 1, wherein the first and second electrodes are made of the same material of as the oriented polycrystalline layer of thermoelectric material.

18. A detector of electromagnetic radiation, comprising:
an oriented polycrystalline layer of thermoelectric material, which is an active layer of the detector,
a substrate superimposed on a top surface of the oriented polycrystalline layer so that a back surface of the substrate is in contact with the oriented polycrystalline layer, the substrate is a target of incident electromagnetic radiation on a front side,
first and second electrodes spaced from one another and in electrical contact with the oriented polycrystalline layer,
wherein the substrate is a ceramic layer and the oriented polycrystalline layer has a crystal orientation at an angle of between 30 degrees and 55 degrees relative to a normal to a top surface of the substrate, which is non-oriented.

* * * * *